(12) United States Patent
Epstein et al.

(10) Patent No.: US 10,857,887 B2
(45) Date of Patent: Dec. 8, 2020

(54) ELECTRIC VEHICLE BATTERY THERMAL MANAGEMENT SYSTEM AND METHOD

(71) Applicant: Lightening Energy, Dover, NJ (US)

(72) Inventors: Michael L Epstein, Bedminster, NJ (US); Christopher K Dyer, Madison, NJ (US); Eric Materniak, Morristown, NJ (US)

(73) Assignee: Lightening Energy, Summit, NJ (US)

( * ) Notice: Subject to any disclaimer, the term of this patent is extended or adjusted under 35 U.S.C. 154(b) by 264 days.

(21) Appl. No.: 15/516,666

(22) PCT Filed: Sep. 29, 2015

(86) PCT No.: PCT/US2015/052985
§ 371 (c)(1),
(2) Date: Apr. 3, 2017

(87) PCT Pub. No.: WO2016/054068
PCT Pub. Date: Apr. 7, 2016

(65) Prior Publication Data
US 2017/0297431 A1    Oct. 19, 2017

Related U.S. Application Data

(60) Provisional application No. 62/059,526, filed on Oct. 3, 2014.

(51) Int. Cl.
*B60L 1/08* (2006.01)
*F01P 3/20* (2006.01)
(Continued)

(52) U.S. Cl.
CPC ............... *B60L 1/08* (2013.01); *B60L 3/003* (2013.01); *B60L 3/0061* (2013.01); *B60L 53/16* (2019.02);
(Continued)

(58) Field of Classification Search
CPC .. B60L 1/08; B60L 11/1874; B60L 2240/425; B60H 2001/00307; F01P 3/20;
(Continued)

(56) References Cited

U.S. PATENT DOCUMENTS 6,138,466 A    10/2000  Lake et al.
2002/0152972 A1*  10/2002  Iwasaki ................... F01P 7/164
                                                    123/41.44

(Continued)

FOREIGN PATENT DOCUMENTS

WO    WO 2013/015926    1/2013

OTHER PUBLICATIONS

Pesaran, Ahmad A. "Battery Thermal Management in EVs and HEVs: Issues and Solutions". Advanced Automotive Battery Conference, Feb. 6-8, 2001, Las Vegas, NV. (Accessed on: Aug. 21, 2019 via https://www.researchgate.net/publication/237250969.) (Year: 2001).*

(Continued)

*Primary Examiner* — Adam A Arciero
(74) *Attorney, Agent, or Firm* — Davidson, Davidson & Kappel, LLC

(57) ABSTRACT

A method of providing coolant to an electric battery for powering a drive train of an electric vehicle is provided. The method includes providing coolant from a coolant source off-board the electric vehicle at a first rate to cool the electric battery during recharging of the electric battery; and circulating coolant through a coolant loop on-board the electric vehicle at a second rate less than the first rate to cool the electric battery after the recharging of the electric battery.

16 Claims, 3 Drawing Sheets

(51) Int. Cl.
| | |
|---|---|
| *F01P 5/10* | (2006.01) |
| *F01P 5/12* | (2006.01) |
| *F01P 7/14* | (2006.01) |
| *F02N 19/10* | (2010.01) |
| *B60L 3/00* | (2019.01) |
| *B60L 58/27* | (2019.01) |
| *B60L 53/18* | (2019.01) |
| *B60L 58/26* | (2019.01) |
| *B60L 53/16* | (2019.01) |
| *B60L 53/302* | (2019.01) |
| *B60H 1/00* | (2006.01) |

(52) U.S. Cl.
CPC ............. *B60L 53/18* (2019.02); *B60L 53/302* (2019.02); *B60L 58/26* (2019.02); *B60L 58/27* (2019.02); *F01P 3/20* (2013.01); *F01P 5/10* (2013.01); *F01P 5/12* (2013.01); *F01P 7/14* (2013.01); *F02N 19/10* (2013.01); *B60H 2001/00307* (2013.01); *B60L 2240/36* (2013.01); *B60L 2240/425* (2013.01); *B60L 2240/525* (2013.01); *Y02T 10/64* (2013.01); *Y02T 10/70* (2013.01); *Y02T 10/7072* (2013.01); *Y02T 90/12* (2013.01); *Y02T 90/14* (2013.01)

(58) Field of Classification Search
CPC ........ F01P 5/10; F01P 5/12; F01P 7/14; F02N 19/10; Y02T 10/705; Y02T 90/14
See application file for complete search history.

(56) References Cited

U.S. PATENT DOCUMENTS

| | | | |
|---|---|---|---|
| 2008/0078542 | A1 | 4/2008 | Gering et al. |
| 2012/0043935 | A1 | 2/2012 | Dyer et al. |
| 2013/0029193 | A1* | 1/2013 | Dyer ................... H01M 10/486 |
| | | | 429/62 |
| 2013/0074525 | A1* | 3/2013 | Johnston ............ B60H 1/00278 |
| | | | 62/56 |
| 2013/0300361 | A1 | 11/2013 | Origuchi et al. |
| 2014/0062397 | A1 | 3/2014 | Dyer et al. |
| 2015/0239365 | A1* | 8/2015 | Hyde .................. B60L 11/1861 |
| | | | 701/2 |

OTHER PUBLICATIONS

Search Report of corresponding PCT International Application.

* cited by examiner

ELECTRIC VEHICLE BATTERY THERMAL MANAGEMENT SYSTEM AND METHOD

The present disclosure relates generally to temperature management of electric vehicle batteries and more specifically to off-board temperature management of electric vehicle batteries during charging.

BACKGROUND

U.S. Pat. No. 8,448,696 discloses an on-board thermal management system.

U.S. Pat. No. 8,174,235 discloses a system and method for recharging electric battery vehicles that involves providing off-board coolant, U.S. Pat. No. 8,350,526 discloses a station for rapidly charging an electric vehicle battery that provides off-board coolant and U.S. Pub. No. 2013/0029193 discloses an electric vehicle and electric vehicle battery for cooling with off-board coolant during charging.

SUMMARY OF THE INVENTION

In accordance with a first feature of the present invention, a method of providing coolant to an electric battery for powering a drive train of an electric vehicle is provided that includes providing coolant from a coolant source off-board the electric vehicle at a first rate to cool the electric battery during recharging of the electric battery; and circulating coolant through a coolant loop on-board the electric vehicle at a second rate less than the first rate to cool the electric battery after the recharging of the electric battery.

In accordance with a second feature of the present invention, a method of providing coolant to an electric battery for powering a drive train of an electric vehicle is provided that includes providing coolant from an off-board coolant source to an on-board coolant loop for cooling the electric battery as a function of parameters of the on-board coolant loop.

In accordance with a third feature of the present invention, a method of providing coolant to an electric battery for powering a drive train of an electric vehicle is provided that includes determining a type of coolant in a coolant loop on-board the electric vehicle in fluid communication with the electric battery; selecting the determined type of coolant from a plurality of off-board coolant sources; and providing the determined type of coolant from an off-board coolant source to the coolant loop on-board the electric vehicle.

In accordance with a fourth feature of the present invention, a method of providing coolant to an electric battery for powering a drive train of an electric vehicle is provided that includes determining a rate of heat released by the electric battery from recharging the electric battery at a specified recharging rate; determining a convective heat transfer coefficient for removing the heat released by the electric battery during the recharging; determining a maximum allowable flow rate of the on-board coolant loop; determining whether an optimal flow rate of the coolant from an off-board coolant source satisfies constraints of the convective heat transfer coefficient and the maximum allowable flow rate; and recharging the electric battery at the specified recharging rate if the optimal flow rate of the coolant from an off-board coolant source satisfies the constraints of the convective heat transfer coefficient and the maximum allowable flow rate, the recharging the electric battery including providing the coolant from the off-board coolant source at the optimal flow rate.

BRIEF DESCRIPTION OF THE DRAWINGS

The present invention is described below by reference to the following drawings, in which.

DETAILED DESCRIPTION

In order to enable electric vehicle recharging at faster rates thermal management an important issue to solve. Higher rate recharging leads to increased heat dissipation within the battery pack. The Tesla Model S for example currently uses an on-board cooling system. An off-board cooling system may allow additional pumps to create a higher flow rate than what the pumps on-board the model S can deliver. High powered on-board pumps add weight to the vehicle so using an off-board cooling system may effectively reduce vehicle weight. In order to enable rapid recharging at a rate greater than the supercharger, the batteries need to be cooled very efficiently. A greater flow rate allows for more convection between the coolant and the cells, resulting in greater heat transfer between the coolant and cells, as well as a decreased temperature gradient between the inlet and outlet of the coolant tubes circulating in the modules. Another benefit of this invention is that a greater volume of liquid can be stored in the off-board system without increasing the weight of the vehicle. Embodiments of the invention could also be used to heat the battery at a greater rate if recharging were to take place in a cold climate. Additionally, the on-board heat exchanger may need to have a significantly greater cooling capacity to enable recharging at higher rates than the current superchargers. This heat exchanger may increase vehicle weight and take up a larger volume which could alternatively be used for more batteries. Significant cost savings for the vehicle may also provide incentive to use an off-board cooling system.

At a 300 kW charge, for example the Tesla model S 85 kWh battery pack creates the need for a coolant inlet temperature of 9° C. to prevent any cell from going into thermal runaway. The proposed 300 kW charger corresponds to a charging time of about 20 minutes for a full recharge for an 85 kWh battery pack. Tesla offers a supercharger that takes about 30-40 minutes for an 80% recharge in ideal conditions. Roughly 100 of these have been installed coast to coast. A 300 kW recharger is in the range of 10-15 minutes for an 80% recharge for the 85 kWh battery pack. Embodiments of invention are not limited to this recharging rate, and most preferably include charging rates of less than 5 minutes.

The heat exchanger on-board the model S may not be capable of achieving this kind of temperature for a given volume of coolant, necessitating an off-board cooling system. During the charging process using the Tesla supercharger, up to 13 kW of heat are generated, and with a 300 kW recharge, upwards of 50 kW of heat is generated. Without off-board cooling, the on-board system is required to have this load placed upon it. The pumps would need to operate at their highest available power for an extended period of time, increasing wear on the system. Scale up of the on-board cooling system may add both cost and weight to the vehicle, increasing overall vehicle cost.

Figure 1:
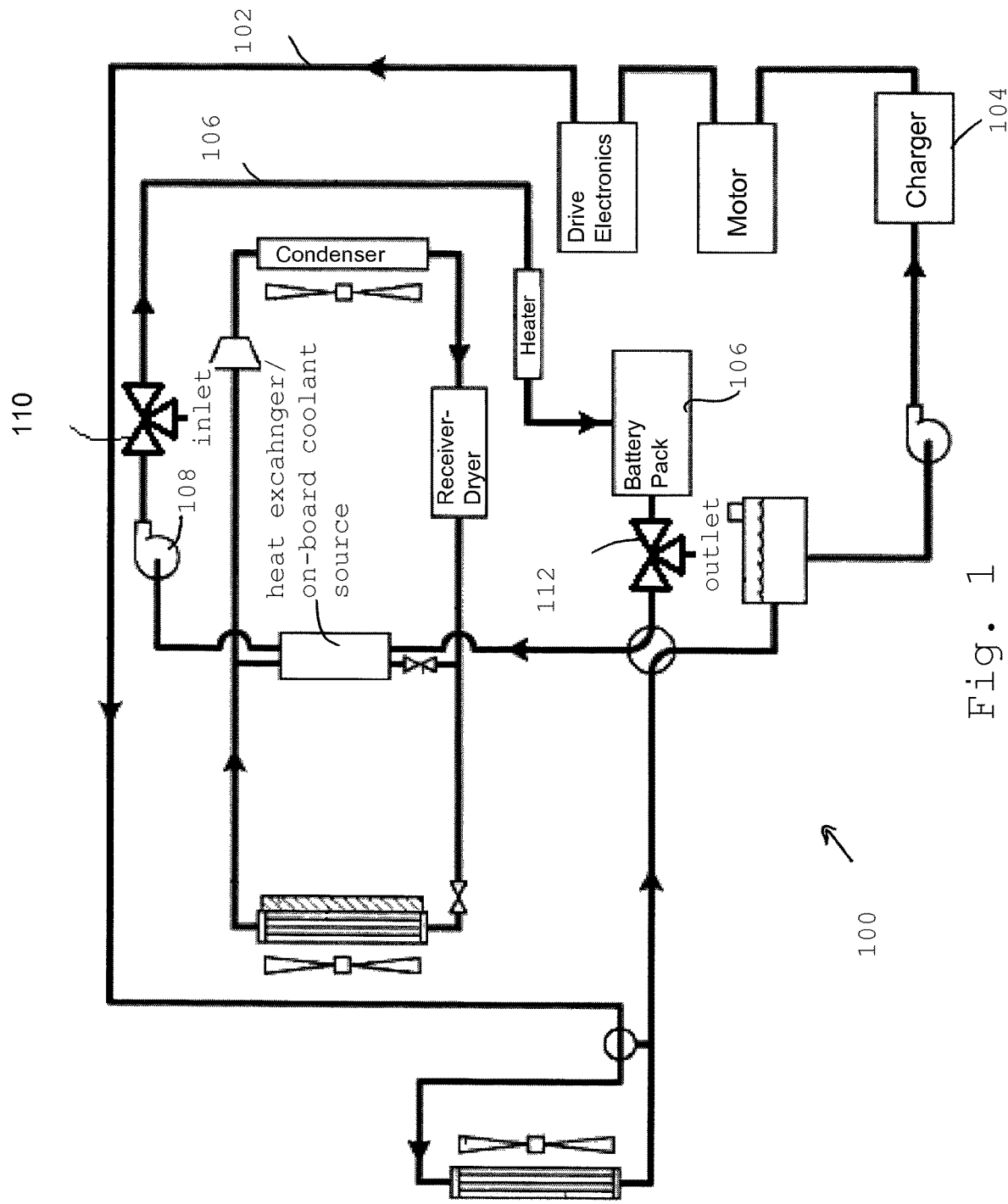
FIG. 1 shows an on-board temperature management system in accordance with an embodiment of the present invention.
Figure 3:
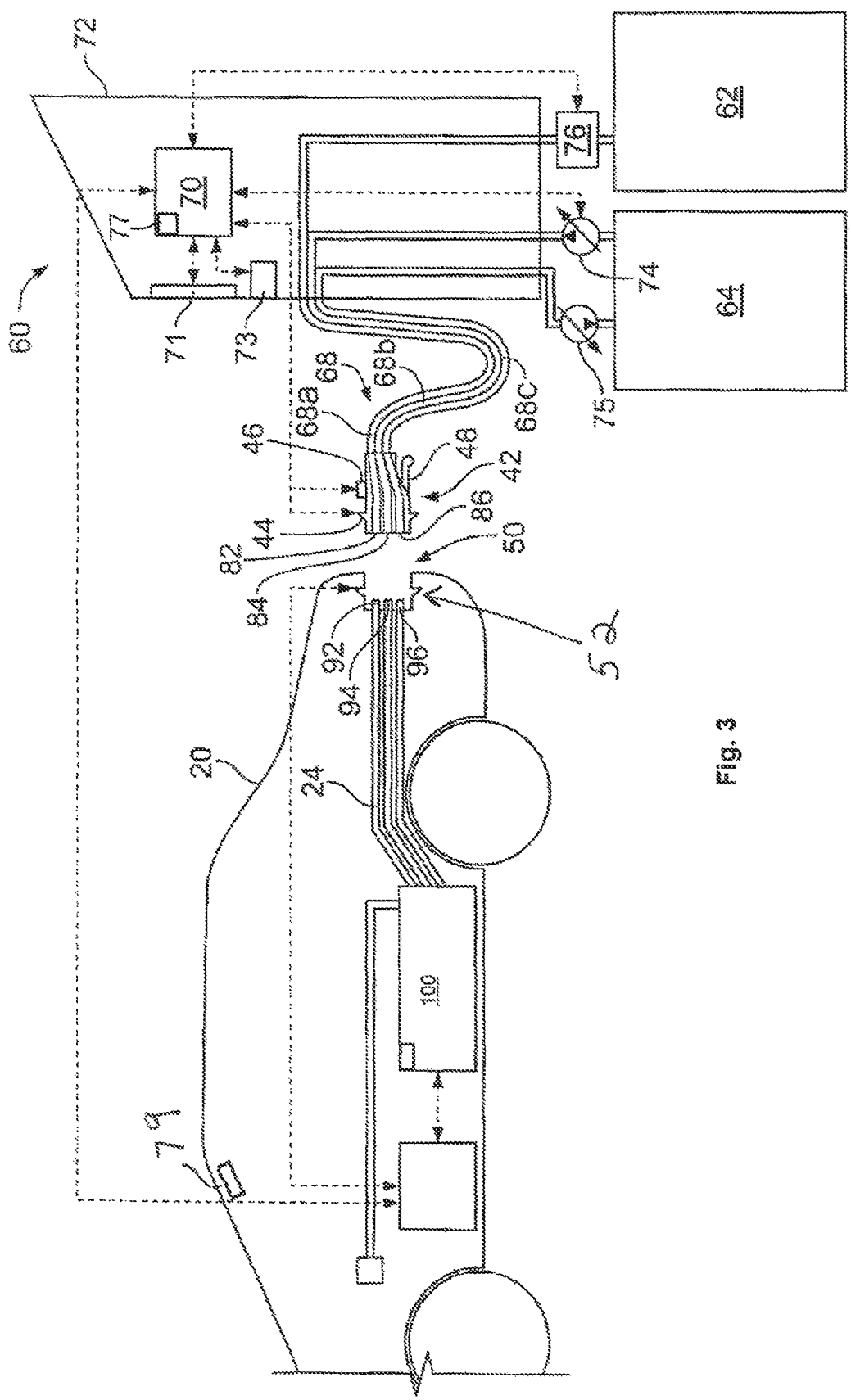
FIG. 3 schematically shows an off-board system in the form of a rapid charging station for charging an electric vehicle including the on-board temperature management system shown in FIG. 1 in accordance with an embodiment of the present invention.

FIG. 1 shows an on-board temperature management system 100 in accordance with an embodiment of the present invention that is connectable to an off-board coolant source of an off-board temperature management system, as shown for example in FIG. 3. An outer cooling loop 102 runs to cool an on-board charger 104. An inner cooling loop 106, which cools at least one battery 106 of a battery pack, which at least in part powers the drivetrain of the electric vehicle, is coupled to an off-board cooling loop. In accordance with this embodiment, a pump 108 of cooling loop 106 on the vehicle ceases to operate once the off-board cooling system is properly connected to the vehicle system. As shown in FIG. 1, an inlet valve 110 for cooling loop 106 is placed after the pump 108 and before the heater. In this embodiment, the valve 110 is a three-way valve but could be any valve capable of shutting off the flow from the on-board system and allowing the off-board coolant to enter. In this embodiment, the off-board coolant is the same as on-board the vehicle.

The coolant passes through the battery pack 106 at the higher flow rate enabled by the off-board pump. After passing through the battery pack 106, the coolant returns to the off-board reservoir (e.g., source 64 in FIG. 3) via an outlet valve 112, which in this embodiment is a 3-way valve. Additionally, embodiments of the invention include the possibility of having multiple inlet and outlet valves. Having a greater number of valves may reduce the thermal gradient within the battery pack.

There are many important parameters to determine and control the maximum rate of charge that an electric vehicle can accept. The off-board system first determines the type of coolant which is on-board the vehicle. This can be determined via database from the vehicle owner's manual. Once it gets this information, then it can tap into a database which has all of the coolant properties, such as heat transfer coefficients, density and viscosity. Most of these coefficients can be obtained by handbooks such as ASHRAE. Some of the heat transfer coefficients may need to be determined experimentally, and those results may then be put into the database. Another piece of information that the off-board system determines is the rate at which it will pump coolant into the vehicle system. This determination involves a calculation based on multiple vehicle parameters. The maximum flow rate can be determined by the maximum power of the off-board pump, as well as the losses in the tubing system on-board the vehicle, including parameters such as the tube cross-sectional area and length. Once this maximum flow rate is determined, the temperature change of the coolant between inlet and outlet can be calculated. Another consideration is the properties of the tube/pipe system for coolant. A maximum pressure at which the coolant can be pumped in the piping system on-board the vehicle may limit the rate of coolant.

The off-board system may also determine and control the temperature at which the coolant is to be pumped. This involves the material properties of the cooling system on-board the vehicle. The surface area in contact with each of the batteries, as well as the thermal conductivity of all the materials in contact is used to determine the necessary coolant temperature. Other properties are involved, such as the mass of each battery, the specific heat, the internal resistance, and the charging current.

Another parameter taken into account in supplying coolant is the chemistry of the batteries on-board the electric vehicle. Certain battery chemistries can handle a maximum rate at which the batteries can be recharged. The off-board system may use this chemistry to determine what current and voltage to feed the on-board batteries.

According to embodiments of the present invention, this information may be compiled in a database which the recharging station may access before initiating the rapid recharge.

Embodiments of the present invention may also include a control system with the ability to monitor the coolant temperature and cell temperature at various points within the battery pack to ensure safety during this rapid recharging process. The off-board system may contain controls to regulate the flow rate and coolant temperature. The sensors on-board the vehicle may relay information back to the off-board system to regulate the flow rate and temperature.

Additionally, there is the potential for a waste heat recovery system associated with the off-board thermal management system. Since a significant amount of heat is lost during charging, this waste energy could be extracted via the higher temperature coolant exiting the vehicle after charging.

The off-board rapid recharging system may first identify the type of vehicle which has just pulled into the recharging station. This may involve scanning an RFID tag or VIN number, or even a user interface in which the vehicle user enters the type of vehicle into the system. If a scanning system, a vehicle may pull into a station and an overhang above the vehicle may have an antenna similar to one used in an E-Z Pass tollbooth. Each electric vehicle owner may be required to purchase a tag similar to E-Z Pass which identifies the vehicle, or as shown below in FIG. 3, an RFID tag may be provided coupled to the battery or another components of the temperature management system 100 in the undercarriage of the vehicle. The owner could then pay for the rapid recharging using an account linked to the RFID tag.

The location of the RFID tag may also be on the windshield near the rearview mirror. Alternatively, the charging station could contain a user interface, including but not limited to smart phone applications or on-site touch screens. The user may then enter the type of electric vehicle from a set of choices, at which point a database may be accessed.

The account associated with the RFID tag may have information such as the vehicle make and model, and year of manufacture.

Once the vehicle has been identified by the methods above, the recharging system may tap into a database with information about the necessary properties of that particular EV. The database of may include but not be limited to the information identified below in Table 1. Such information may be required to determine the necessary coolant temperature and flow rate during the recharging process. Information not listed in this table could be determined from lab experiments used to further populate the database. Data also could be obtained from other databases such as electric vehicle spec sheets, owner's manuals, parts lists, or other resources. Such a database may include major categories such as vehicle type, vehicle components, and the properties and values associated with those components.

TABLE 1

EV Database

| Category | Properties | Data/Value |
|---|---|---|
| Vehicle Make | Tesla | |
| Vehicle Model | Model S | |
| Vehicle Year | 2013 | |
| Type of Coolant | Ethylene Glycol - G48 | |
| | Coolant Properties | |
| | density | 1.121 g/cm^3 |
| | viscosity | 12.95 mPa/s |
| Pump Specs | max sustained power | 800 W |
| Vehicle Cooling System Information | Tubing length per module | 7.2 m |
| | Tubing materials | copper |
| | | silicone elastomer blend |
| | | silicone adhesive |
| | tubing material properties | |
| | thermal conductivity copper | 385 W/mK |
| | thermal conductivity silicon elastomer | ⅓ W/mK |
| | thermal conductivity adhesive | 1.8 W/mK |
| | Tubing cross sectional area | 1.2e−4 m^2 |
| | Heat Exchanger cooling capacity | look up/determine |
| | Max pressure allowed in tubes | look up/determine |
| Vehicle Battery Information | internal chemistry | NCA/max charge rate |
| | max recharge rate without damage | 120 kW |
| | specific heat of battery | 0.823 J/gC |
| | cell mass | 45.0 g |
| | charging current/voltage for system | 297.6 A/403.2 V |
| | number of cells/modules/configuration | 7104 cells/16 modules |
| | internal resistance | 60 milliohms |
| | max allowable cell temperature | 40 degrees C. |
| | min allowable cell temperature | look up/determine |
| | surface area in contact between cells and cooling tube | 0.0006655 m^2 |
| | entropy produced by cells as a function of state of charge | maximum - 68.31 kJ/mol |

Figure 2:
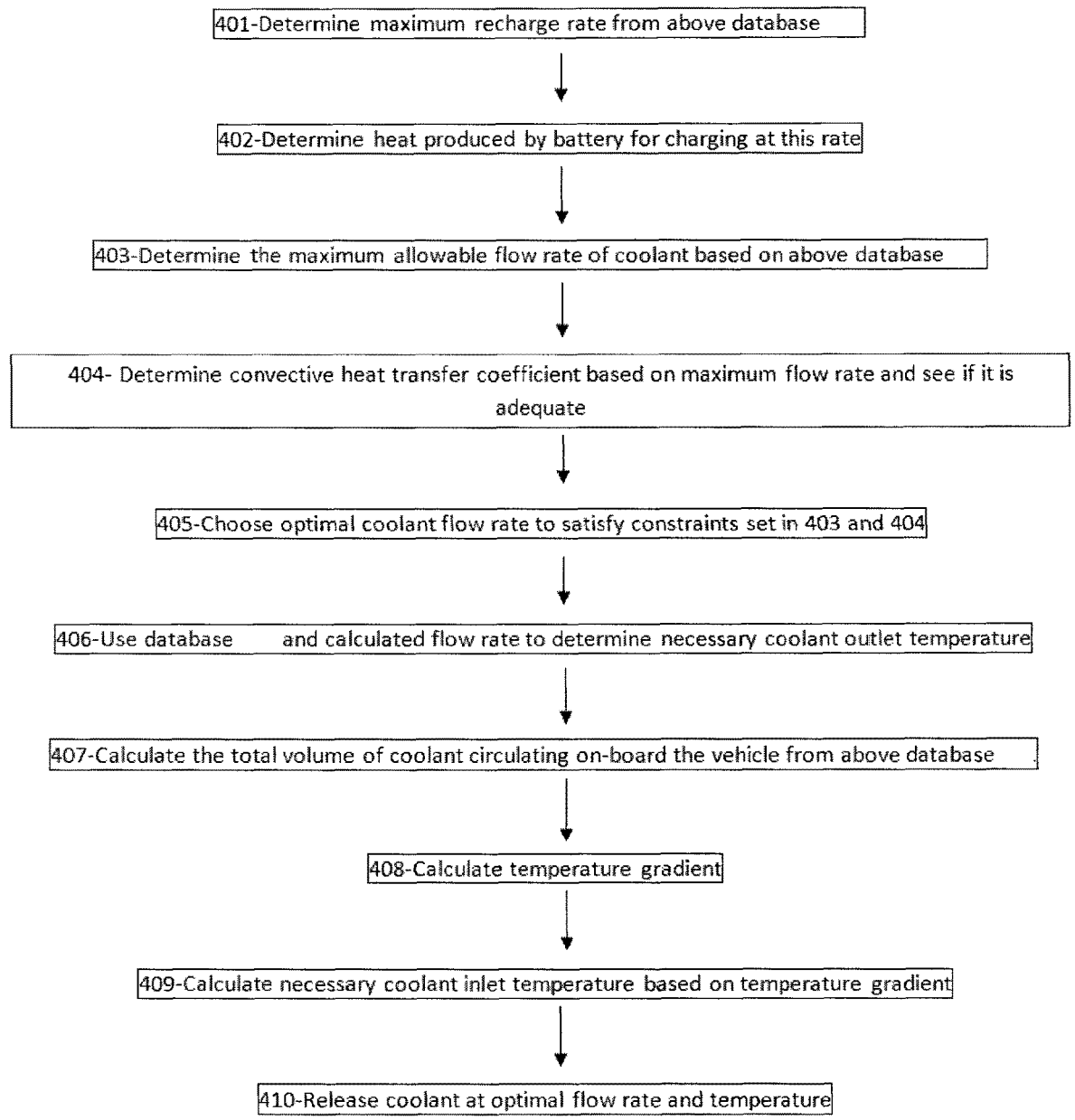
FIG. 2 shows a flow chart illustrating a method in accordance with an embodiment of the present invention.

FIG. 2 shows a flow chart illustrating a method in accordance with an embodiment of the present invention. The method includes an algorithm that may perform computations after accessing the information shown in Table 1 from the database. As seen from the flow chart above, a first step 401 involves accessing the maximum recharging rate from the database. This may be used to provide the maximum allowable current and voltage that the system can use to recharge the vehicle. This voltage and current along with other values from the database can be used to obtain 402, or the rate of heat released q̇ during this rapid recharging period.

$$\dot{q} = I^2 R + T_{cell} \Delta S \frac{I}{F}$$

Step 403 involves determining the limiting factor on the maximum flow rate allowed through the tubing system. This depends on the pump power, the strength of the piping materials, and the cooling capacity of the heat exchanger. For the proposed off-board system, the limiting factors may be the pump power of the off-board system, and the maximum pressure which the on-board pipes can handle. The following is a sample calculation based on multiple parameters obtained from the database which determines the maximum flow velocity based on a given pump power.

$$\dot{W}_h = \eta \rho \dot{q} g h_l = \rho q g f \frac{L}{D} \frac{V^2}{2g} =$$

-continued $$\eta \rho V \left( \frac{0.00012 \text{ m}^2}{1} \right) g \frac{24\mu}{\rho V D} \frac{L}{D} \frac{V^2}{2g} = \eta V \left( \frac{0.00012 \text{ m}^2}{1} \right) \frac{12\mu}{D} \frac{L}{D} V$$

Now solving for velocity V:

$$V^2 = \frac{\dot{W}_h D^2}{12 \eta \mu L \left( \frac{0.00012 \text{ m}^2}{1} \right)} = \frac{18.56 \text{ m}^2}{s^2}$$

Using the values from above, as well as the pump efficiency η, solve for $V_{max}$. For now, assume the pump is 100% efficient.

$V_{max}$=4.308 m/s

An alternative limiting factor in step 403 may be the maximum pressure which the pipes of the on-board cooling system can handle. In the case of the Tesla Model S for example, the pipes are made of some kind of metal, including but not limited to copper or aluminum, and are 0.5 mm thick. Using the flow velocity calculated above in step 403, the pressure within the tubing system can be determined.

$$P = \rho g h = \left( \frac{1121 \text{ kg}}{m^3} \right) \left( \frac{9.8 \text{ m}}{s^2} \right) (140.85 \text{ m}) = 1.547 \text{ MPa}$$

$$P = \frac{2(\text{strength})(\text{thickness})}{(D)(\text{safety factor})}$$

$$P = \frac{2(33.3 \text{ MPa})(0.0005 \text{ m})}{(0.00706 \text{ m})(1.5)} = 3.14 \text{ MPa}$$

In this particular case with a copper tube, the pipe burst pressure is above the maximum pressure due to the coolant flow rate. In other instances, this may not be the case and the maximum flow rate could be limited by this pressure.

In order to determine the necessary convective heat transfer coefficient 404, the database can access experimental research or a calculation can be used to derive the coefficient empirically. Other necessary heat transfer coefficients of the tubing materials may be accessed from the database in this stage.

Step 405 involves choosing the optimal coolant flow rate which meets the constraints set in steps 403 and 404. The coolant flow rate does not exceed the maximum allowable flow rate, yet it meets the necessary heat transfer coefficient. If by chance the required heat transfer coefficient cannot be achieved by a flow rate less than the maximum, then the maximum recharge rate determined in step 401 may be re-calculated, and the process may begin again at step 401. The optimal flow rate 405 may be chosen with a given safety factor above the minimum necessary heat transfer coefficient 403 and the maximum flow rate 404.

Once the flow rate in step 405 is obtained, the necessary coolant outlet temperature 406 may be calculated using values from the database. This temperature represents the warmest temperature the coolant can be in order to prevent the last cell in the coolant loop from becoming too hot to safely charge. The following is a sample equation for determining the coolant outlet temperature, where T_coolant is the unknown variable. All of the values in the denominator represent various coefficients and thicknesses of the tubing materials. These values depend on the different thermal layers between the battery cells and the cooling system and may be different for each type of vehicle.

$$\dot{q} = \frac{A(T_{cell} - T_{coolant})}{\left(\frac{1}{h} + \frac{L}{k_c} + \frac{1}{h_c} + \frac{t}{k_s} + \frac{t2}{k_s}\right)}$$

Step 407 involves a calculation of the total coolant volume in the tubes adjacent to the battery pack. This specific volume is important because it represents the volume of coolant which absorbs the heat produced by the battery pack during the charging process.

This volume may be used to determine the temperature gradient 408 between the coolant tube inlet and outlet in each battery pack module. Maximizing the flow rate through the cooling tubes may minimize this temperature gradient. A sample calculation of how to determine this temperature gradient is provided, where the values on the left hand side are obtained from either database or prior calculations. This particular calculation shows the estimated coolant temperature gradient when using a 300 kW charger.

$$\frac{q}{mc_p} = \Delta T = 3.28 K$$

The final calculation 409 may determine the necessary coolant inlet temperature. This may be the temperature at which coolant may be pumped from off-board the vehicle into the on-board cooling system. The off-board system may then release the coolant at the necessary pressure and temperature through tubing connected to the vehicle (410).

The control system linking the vehicle to the off-board system may constantly monitor the coolant temperature and cell temperatures at various points on-board the vehicle. If any cell temperature becomes too high, the system may increase the coolant flow rate assuming that it is less than the maximum. If the flow rate cannot be increased, the charging may stop momentarily until a more stable temperature is achieved.

FIG. 3 schematically shows an off-board system in the form of a rapid charging station 60 for charging an electric vehicle 20 including on-board temperature management system 100 according to an embodiment of the present invention. In the preferred embodiment of the present invention, electric vehicle 20 is a pure electric vehicle including an electric vehicle battery pack 106, but not an internal combustion engine, powering a drive system of vehicle 20. In an alternative embodiment, electric vehicle 20 may be a hybrid electric vehicle and may include an internal combustion engine working in cooperation with electric vehicle battery pack 106.

Rapid charging station 60 may include an electric power supply system 62 for rapidly charging battery pack 106 of vehicle 20 and an off-board temperature management system 64 for supplying heat exchange fluid to battery pack 106 as battery pack 106 is rapidly charged by electric power supply system. The driver of vehicle 20 may pull into rapid charging station 60, turn off vehicle 20 and insert a connector 42 on an end of a supply line 68 of rapid charging station 60 into a corresponding receptacle 50 of vehicle 20 that is accessible from the outside of vehicle 20. In the embodiment shown in FIG. 3, supply line 68 extends outside of a base portion 72 and includes an electrical supply line 68a, which may be a cable, coupled to electric power supply system 62 and a heat exchange fluid supply line 68b, which may be a hose, coupled to off-board coolant supply 64. The driver may insert connector 42 into receptacle 50 of vehicle 20 such that connector 42 is temporarily locked into place in receptacle 50. Receptacle 50 may include one or more grooves 52 formed therein for receiving a corresponding number of protrusions 44 extending radially from connector 42. Protrusions 44 may be spring loaded with respect to connector 42 and may be forced to retract radially into connector 42 via contact with the outside of receptacle 50 and then actuate radially outward into grooves 52 once connector 42 is in receptacle 50. Protrusions may also be retracted via the driver pushing a locking/unlocking actuator 46, which in this embodiment is a push button on connector 42, and once connector 42 is inserted in receptacle 50, actuator 46 may be released so protrusions 44 enter into grooves 52. After connector 42 is locked in place in receptacle 50, with protrusions 44 cooperating with grooves 52 to prevent connector 42 from being pulled out of receptacle 50, the driver may activate a charging/cooling actuator, which in this embodiment is in the form of a handle 48 that may be gripped and squeezed toward connector 42 to begin the flow of current from electric power supply system 62 and the flow of heat exchange fluid from off-board coolant supply 64 into battery pack 106.

After heat exchange fluid passes through battery pack 106 and exits outlets of battery pack 106, the heat exchange fluid enters exits the outlet of outlet valve 112. The heated heat exchange fluid then is pumped out of a heat exchange fluid outflow section 96 in receptacle 50 into a heat exchange fluid return section 86 in a connector 42 and through a return line 68c into off-board coolant supply 64 by a return pump 75. The heat exchange fluid returned to off-board coolant supply 64 is thermally conditioned for reuse.

A controller 70 may be provided for controlling the amount of charge supplied to battery pack 106 from electric power supply system 62 and to control the supply of coolant from off-board coolant supply 64 as described above. Controller 70 may also be a coupled to a touchscreen 71 and a credit card receptacle 73. As similarly discussed above, controller 70 also may be coupled with a detector, for example in the form of an radio-frequency identification ("RFID") reader 77 in communication with an information source in the form of a RFID tag 79 of vehicle 20 wherein communication between the reader and tag may input data for controlling one or more of the recharge, heat exchange fluid and transaction parameters. The detector and information source may take a variety of alternative or combined detection and communication forms, such as an optical, magnetic, acoustic, pattern recognition or other detector and compatible information source.

When rapid charging station 60 begins charging, rapid charging station 60 provides current from electric power supply system 62 and heat exchange fluid from off-board coolant supply 64 to battery pack 106 until battery pack 106 is sufficiently charged. Heat exchange fluid is pumped by an off-board pump 74, which has a greater pumping capacity than the on-board pump 108 (i.e., pump 74 may pump heat exchange fluid at a higher rate than the on-board pump 108), through heat exchange fluid supply line 68b. Off-board system 60 provides coolant from coolant source 64 off-board the electric vehicle 20 at a first rate to cool electric batteries of pack 106 during recharging of battery pack 106. On-board system 100 circulates coolant through coolant loop 106 on-board the electric vehicle 20 at a second rate less than the first rate to cool the electric batteries of battery pack 106 after the recharging of the electric batteries. The heat exchange fluid exits heat exchange fluid supply line 68b at a heat exchange fluid supply section 84 in connector 42 and enters into the inlet of valve 110 (FIG. 1) of system 100 in vehicle 20 at a heat exchange fluid inflow section 94 in receptacle 50. The heat exchange fluid supply conduit is coupled to the inlet s of battery pack 106 and supplies heat exchange fluid to battery pack 106. Current is sent from electric power supply system 62 by a power feeding apparatus 76 through electrical supply line 68a. The current exits electrical supply line 68a at an electrical supply section 82 in connector 42 and enters into an electrical conduit 24 in vehicle 20 at an electrical inflow section 92 in receptacle 50. In order to prevent connector 42 from being removed from receptacle 50 while current and heat exchange fluid are being supplied into vehicle 20, protrusions 44 are prevented from being retracted into connector 42 during charging. Connector 42 may also include spring loaded couplings at or near heat exchange fluid supply section 84 that allow for quick sealing of supply section 84 during the removal of connector 42 from receptacle 50 to prevent heat exchange fluid leakage.

Embodiments of invention may include other recharging stations, including but not limited to home based recharging stations. These home based recharging stations could be specific to the type of vehicle being recharged by the user.

The recharging stations at home could withdraw current from the grid at a slower rate during off-hours to recharge an associated battery pack which would rapidly discharge to provide power to the vehicle to recharge its batteries.

One of the primary benefits of embodiments of the invention is the potential weight, cost, and volume savings associated with not needing to upgrade the electric vehicle's on-board system. An improved heat exchanger may be provided to accept higher rates of recharge. The heat exchanger may have a cooling capacity required to absorb the 50 or more kW of heat generated during a 300 kW recharge. Heat exchangers capable of handling a rate of 120 kW may also be used.

The extra volume required to include a heat exchanger with 50 kW cooling capacity is significant. A heat exchanger capable of removing 50 kW of heat could take up 0.226 $m^3$ additional volume in comparison to a heat exchanger capable of removing only 8 kW of heat. This additional volume could take away from either the trunk space or the battery capacity of the vehicle. If this volume were taken away from the battery capacity, then it could result in a capacity loss of up to 29.73 kWh, or 93 miles range! Table 2 summarizes the benefits of an exemplary embodiment of the present invention and in particular an off-board cooling system.

TABLE 2

| | |
|---|---|
| Weight Savings | 23 kg or 50.7 lbs |
| Cost Savings | $2,700 |
| Volume Savings | 0.2212 m^3 |
| additional capacity from volume savings | 29.73 kWh or 93 miles range |

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of providing coolant to an electric battery for powering a drive train of an electric vehicle comprising:
   providing off-board coolant from a coolant source off-board the electric vehicle at a first rate to cool the electric battery during recharging of the electric battery; and
   circulating on-board coolant through an on-board coolant loop on-board the electric vehicle via an on-board pump at a second rate less than the first rate to cool the electric battery after the recharging of the electric battery,
   wherein the providing of the off-board coolant from the coolant source off-board the electric vehicle at the first rate includes injecting the off-board coolant into the coolant loop at an inlet valve upstream of the electric battery and downstream of the on-board pump.

2. The method as recited in claim 1 wherein an off-board pump off-board the electric vehicle having a first pumping capacity provides the coolant at the first rate during the recharging of the electric battery, the on-board pump having a second pumping capacity at the second rate after the recharging of the electric battery, the first pumping capacity being greater than the second pumping capacity.

3. The method as recited in claim 1 further comprising, during recharging of the electric battery, providing the coolant exiting the electric battery to the coolant source off-board the electric vehicle.

4. The method as recited in claim 3 wherein the providing the coolant exiting the electric battery to the coolant source off-board the electric vehicle includes controlling an outlet valve in the coolant loop downstream from the electric battery to direct the coolant from the coolant loop to the coolant source off-board the electric vehicle.

5. The method as recited in claim 1 wherein the on-board coolant and the off-board coolant are the same.

6. The method as recited in claim 1 further comprising shutting off the on-board pump before the providing of the off-board coolant from the coolant source off-board to the electric vehicle.

7. The method as recited in claim 1 wherein the on-board coolant loop includes a heater downstream of the inlet valve and upstream of the electric battery.

8. The method as recited in claim 1 further comprising shutting off coolant flow from an on-board coolant source to the electric battery via the inlet valve before the providing the off-board coolant from the coolant source off-board the electric vehicle through the inlet valve.

9. The method as recited in claim 8 wherein the inlet valve is a three-way valve.

10. The method as recited in claim 1 further comprising controlling the providing of the off-board coolant from the coolant source off-board the electric vehicle based on a make, model and year of the vehicle.

11. The method as recited in claim 10 wherein the controlling of the providing of the off-board coolant from the coolant source off-board the electric vehicle based on the make, model and year of the vehicle includes accessing a database including data for the on-board coolant.

12. The method as recited in claim 11 wherein the data for the on-board coolant includes a density and viscosity of the on-board coolant.

13. The method as recited in claim 10 wherein the controlling of the providing of the off-board coolant from the coolant source off-board the electric vehicle based on the make, model and year of the vehicle includes accessing a database including data for tubing of the coolant loop.

14. The method as recited in claim 13 wherein the data for the tubing of the coolant loop includes a thermal conductivity of materials of the tubing.

15. The method as recited in claim 13 wherein the data for the tubing of the coolant loop includes a length of the tubing.

16. The method as recited in claim 3 further comprising extracting waste heat energy from the coolant provided to the coolant source off-board the electric vehicle via a waste heat recovery system.

* * * * *